United States Patent [19]

Gummerson

[11] Patent Number: 5,483,789
[45] Date of Patent: Jan. 16, 1996

[54] LATERALLY MOVABLE GRASS CUTTING MOWER ATTACHMENT

[76] Inventor: Elwyn W. Gummerson, R.R. #2, Tavistock, Ontario, Canada, N0B 2R0

[21] Appl. No.: 231,132

[22] Filed: Apr. 22, 1994

[51] Int. Cl.⁶ .................................................. A01D 34/64
[52] U.S. Cl. .................. 56/15.5; 56/15.6; 56/DIG. 22; 56/14.7
[58] Field of Search ....................... 56/14.7, 15.5, 56/15.6, 16.3, DIG. 22

[56] References Cited

U.S. PATENT DOCUMENTS

| | | |
|---|---|---|
| 2,601,366 | 6/1952 | Chapman . |
| 2,662,561 | 12/1953 | Duncan, Jr. . |
| 2,699,635 | 1/1955 | Burton . |
| 2,719,081 | 9/1955 | Stamford et al. . |
| 2,840,974 | 7/1958 | Dunn et al. . |
| 2,997,835 | 8/1961 | Stewart . |
| 3,061,996 | 11/1962 | Ripps . |
| 3,063,226 | 11/1962 | Pfauser . |
| 3,274,762 | 9/1966 | Jolls . |
| 3,669,194 | 6/1972 | Zurek ............................. 56/15.5 X |
| 3,672,137 | 6/1972 | Hamouz et al. ................ 56/16.3 X |
| 3,680,880 | 8/1972 | Blaauw ...................... 56/DIG. 22 X |
| 3,706,186 | 12/1972 | Hurlburt et al. ................ 56/16.3 X |
| 3,750,377 | 8/1973 | Clark ................................. 56/10.4 |
| 3,797,209 | 3/1974 | Davis ................................. 56/13.6 |
| 4,206,580 | 6/1980 | Ushijima ............................. 358/219 |
| 4,329,833 | 5/1982 | Witzel ............................ 56/15.5 X |
| 4,518,043 | 5/1985 | Anderson et al. ............. 56/10.4 X |
| 4,697,405 | 10/1987 | DeWitt et al. ..................... 56/10.4 |
| 4,747,255 | 5/1988 | Roden ................................ 56/10.4 |
| 4,893,456 | 1/1990 | Wallace .............................. 56/15.5 |
| 4,901,508 | 2/1990 | Whatley ............................. 56/10.4 |
| 5,025,617 | 6/1991 | Kuhn et al. ........................ 56/15.6 |
| 5,035,107 | 7/1991 | Scarborough ..................... 56/10.4 |

*Primary Examiner*—George A. Suchfield
*Attorney, Agent, or Firm*—Louis Weinstein

[57] ABSTRACT

A transversely-mounted grass cutter mower combination with a vehicle is provided which is adapted to be activated to move laterally to the right or to the left with respect to its mounting to the vehicle and/or to move vertically up or down with respect to its mounting to the vehicle. The mounting is a suspending mounting system including transversely-mounted tracks which are pivotally-secured by a parallelogram linkage to the longitudinal chassis of the vehicle. The tracks include a first powered operator for moving the transversely-mounted tracks through an infinite number of vertical locations between an upper limit and a lower limit. Rollers are provided on the suspended mounting system which are rollingly operatively associated with the transversely-mounted track which is mounted on the mower housing. A second powered operator is provided for moving the mower housing an infinite number of lateral locations between a left lateral limit and a right lateral limit, by means of appropriate linkages.

8 Claims, 5 Drawing Sheets

LATERALLY MOVABLE GRASS CUTTING MOWER ATTACHMENT

BACKGROUND OF THE INVENTION (i) Field of the Invention

This invention relates to a grass cutting mower attachment in a vehicle which is adapted to be activated to move quickly laterally to the right or to the left of the vehicle and/or up or down vertically of the vehicle.

(ii) Description of the Prior Art

Up to the present time the most versatile grass cutting machines require the operator to move the complete vehicle in a series of maneuvers around obstacles. This constant maneuvering can be nauseating, tiring and time consuming. There are now a number of mower devices which have been adapted for mounting on vehicles and include some form of retraction and extension apparatus for moving the mowers or saws towards and away from the vehicle. Some such retractable mower devices are shown in U.S. Pat. No. 2,719,081, issued to Allen et al, U.S. Pat. No. 2,662,561, issued to Duncan, U.S. Pat. No. 2,699,635, issued to Burton, U.S. Pat. No. 2,601,366, issued to Chapman, U.S. Pat. No. 3,003,299, issued to Smith et al, U.S. Pat. No. 3,061,996 issued to Ripps, U.S. Pat. No. 3,274,762 issued to Jolls, U.S. Pat. No. 4,048,789, issued to Cartner, U.S. Pat. No. 2,997,835, issued to Stewart, U.S. Pat. No. 2,840,974 issued to Dunn et al, and U.S. Pat. No. 4,206,580 issued to Truax et al. The mowers of the patents issued to Allen, Duncan, Burton, Chapman, and Smith are equipped with mechanical retraction devices, and the mowers shown in the patents issued to Ripps, Jolls, Cartner, Stewart, Dunn, and Truax are equipped with hydraulic retraction mechanisms.

In U.S. Pat. No. 3,063,226 issued to E. M. Pfauser, a riding type rotary mower is disclosed having the housing of a rotary cutting unit suspended beneath the mower by means including a parallel linkage arrangement. The mower is capable of traversing uneven terrain, and for this purpose, runners are provided at the edges of the housing to lift the cutter housing when a runner rides over a mound. The drive shafts to the rotary mower blades are provided with splines so that as the housing raises, the drive shafts telescope. Also, the axes of the links of the parallel suspension linkage are set at an angle with the vertical of approximately 70° which permit slight rearward movement of the cutter housing as the housing raises.

The suspension mechanism of the rotary mower structure disclosed in such patent is designed to elevate the cutter unit rather than to displace it rearwardly because the couplings and the linkage accommodate only slight rearward movement. Thus, upon striking an obstacle, e.g., a rock, with a part of the cutter housing other than the runners, the cutter housing would respond substantially in the manner of the conventional rear-pivoted cutter bar assemblies.

U.S. Pat. No. 4,697,405 disclosed a multi-blade cutting head supported by a tractor towed trailer moving along and guided by a guard rail for mowing thereunder. Telescoping and pivoting arms, extending above and beyond the upper limit of the guard rail, supported a mowing head rotatable about a vertical axis when encountering a guard rail post.

U.S. Pat. No. 3,750,377 patented Aug. 7, 1973 by J. R. Clark provided a weed cutting attachment secured to a tractor angled at approximately 45° with respect to the direction of travel, rides beneath the surface of the soil cutting the weeds. A plurality of these blades were equiangularly disposed about a rotatably positionable platform. The platform was angled with respect to horizontal such that only one blade was in contact with the soil at any one position of the platform. A feeler extended forwardly of the platform to detect any trees in the path of the cutting blade. Upon detection of a tree, the feeler tripped a release mechanism, which permitted the platform to rotate due to the drag of the embedded blade. Rotation of the platform will, because of the angular relationship of the platform, the blades, and the soil, cause the then embedded blade to rotate and rise above the soil. Simultaneously, another of the cutting blades will be rotated until it came into contact with the soil and embedded itself to resume the weed cutting function. During the rotation of the platform, the position of the tree with respect to the moving platform was such that the cutting blades passed on either side of the tree, thereby preventing them from inflicting damage to the tree.

U.S. Pat. No. 4,518,043 patented May 21, 1985 by J. F. Anderson et al provided a retractable in-row tiller device that had a parallelogram carriage structure for supporting the outrigger arm and tiller and for retracting and extending the outrigger arm and tiller in relation to the tractor on which it was mounted. It also included an electro-hydraulic control system with a single wand plant feeler device that provided accurate and responsive automatic control to guide the tiller around plants and which can be overridden and operated manually with ease and accurateness. It also included an automatic positive depth control feature operated electro-hydraulically by a gauge wheel.

U.S. Pat. No. 4,747,255 patented May 31, 1988 by R. Roder provided an agricultural mower which included a parallel linkage suspension mechanism for the cutter assembly, the suspension mechanism including swing arms which, in the use position, were substantially vertically-oriented, enabling the cutter assembly, upon striking an object, to respond by moving quickly rearwardly relative to the forwardly travelling main frame, and then, as the pendulum action continued, to elevate the cutter assembly above the obstruction to a clearing height. In the use position, the cutter bar and guards were directed down and forward defining the lowest and leading part of the cutter assembly.

U.S. Pat. No. 4,901,508 patented Feb. 20, 1990 by D. L. Wheatly provided a mower for mowing vegetation under a fence supported above the surface of the earth by a series of spaced posts. The mower included a horizontal boom connected at one end with a prime mower and supporting a mowing head at its other end. The mowing head was pivotal about vertical and horizontal axes so that when contacting one of the fence posts, the mowing head pivoted around the position of the post while drawn by the prime mover in a forward direction. The mowing head was angularly tilted vertically for mowing a fence row or other surface on an incline with respect to the surface of the earth supporting the prime over.

U.S. Pat. No. 5,035,107 patented Jul. 30, 1991 by J. H. Scarborough provided a rotary lawn mower having a trimming attachment for trimming around fence posts and the like is provided. The trimming attachment assembly included an auxiliary trimming blade mounted in a housing and attached to a swing arm assembly, mounted on the primary mower housing. In the forward position, the trimming attachment extended outwardly from, but slightly overlapped, the mowed path of the primary mower. As a fence post or the like adjacent the primary mower was encountered by the trimming attachment assembly, the trimming attachment assembly was pushed rearwardly by the obstruction and swung into the mowed path of the primary mower, during which process the grass near the fence post was cut. As the fence post or other object was passed, an actuator assembly forced the trimming assembly back into its original forward auxiliary cutting position.

DESCRIPTION OF THE INVENTION

Aims of the Invention

In spite of these prior patents, there is still a need for a grass mower attachment capable of attaining the following objects:

allowing the operator to trim grass closely around trees, shrubs, buildings and the like, while still allowing the vehicle to travel in a relatively straight track across the turf;

allowing the operator to cut a grass pattern with sharp 90 degree turns even though the supporting vehicle may only have a minimum turning radius;

allowing the operator to move between narrow obstacles that would otherwise be impossible with other horizontally-fixed grass cutting machines;

providing a vehicle which is capable of supporting a grass cutting attachment below the waste area, and between the front and rear axle of the vehicle, or ahead of the front axle of the vehicle, or to the right or left side of the vehicle;

providing a cutting attachment which is supported and carried by any suitable attaching linkage arrangement that will allow the cutting attachment to shift horizontally, to the right and/or left of the vehicle, while the cutting attachment is in any vertical height relative to the supporting vehicle;

providing a cutting machine which is also attached and carried by any suitable attaching linkage arrangement that will allow the cutting attachment to be lifted and lowered in a vertical direction, relative to the vehicle, while the cutting attachment is in any horizontal position relative to the supporting vehicle;

providing a controlling mechanism that will quickly and effectively cause the grass cutting attachment to lift or to lower while the cutting attachment is in any horizontal position, as it relates to the supporting vehicle, by means of any suitable mechanical linkage arrangement, or any effective hydraulically-assisted mechanical linkage arrangement, or any combination of the above, and/or to shift laterally to the left or to the right of the supporting vehicle, by means of any suitable mechanical linkage arrangement, or any effective hydraulically-assisted mechanical linkage arrangement, or any effective electrically-assisted mechanical linkage arrangement, or any combination of the above.

Statement of Invention

By the present invention, the combination is provided of a motor driven vehicle having front wheels and rear wheels and a longitudinally-extending frame bed therebetween, and a transversely-mounted powered grass-cutting mower having a housing and powered grass cutting blades mounted to the frame bed, by means of a suspending mounting system. Such mounting system comprises (i) transversely-mounted track means pivotally-secured by a parallelogram linkage to the longitudinal chassis of the motor driven vehicle, the track means including first powered operating means for moving the transversely-mounted track means, and thus the mower housing through an infinite number of vertical locations between an upper limit and a lower limit and, (ii) roller means on the mower housing rollingly operatively associated with the transversely-mounted track means on the mower housing and a second powered operating means, for moving the mower housing through linkage means connected to the mower housing an infinite number of lateral locations between a left lateral limit and a right lateral limit.

Features of the Invention

By one feature thereof, the track means includes two pairs of longitudinally spaced-apart transversely-extending U-channel members.

By another feature thereof, the second powered operating means includes a Y-shaped yoke, one arm of which is pivotally-connected to the rear of one longitudinally-extending frame member forming the frame bed, a leg of which is pivotally-connected to one end of a lever arm, the other end of such lever arm being pivotally-connected to the mower housing, and another arm of the Y-shaped yolk being pivotally-connected to the piston rod end of a hydraulic cylinder, the cylinder end of which being pivotally-connected to the rear of a second longitudinally-extending frame member forming the frame bed.

By another feature thereof, the parallelogram linkage comprises a right linkage and a left linkage, each such linkage including a first arm which is pivotally-connected at its upper end to a first point of a first longitudinally-extending frame member forming a part of the frame bed, a second arm which is pivotally-connected at its upper end to a longitudinally-spaced-apart second point of the first longitudinally-extending frame member, and a third arm which is pivotally-connected at its forward end to the lower end of the first arm and which is pivotally-connected at its rear end to the lower end of the second arm, the fourth element of the parallelogram linkage comprising the longitudinally-spaced-apart portion of the first longitudinally-extending frame member between the first point and the second point.

By still another feature thereof, the first powered operating means comprises a hydraulic cylinder, the cylinder end of which is pivotally-connected to a transverse member interconnecting two longitudinally-extending frame members forming the frame bed, the piston rod end of which is pivotally-connected to a lever which is attached to a rotational cross-shaft which is secured to one end of a linkage rod and pull rod, the pull rod being pivotally operatively-connected to the first arm.

By a still further feature thereof, the first powered means comprises a hydraulic cylinder, the cylinder end of which is pivotally-connected to a transverse member interconnecting two longitudinally-extending frame members forming the frame bed, the piston rod end of which is operatively-connected to a lever which is operatively attached by a rotational cross-shaft to a pulling link by protruding through a longitudinally-extending slot in the pulling link, the pulling link being secured to one end of a linkage rod and a pull rod, the pull rod being pivotally-operatively-connected to the first arm.

By a still further feature thereof, the mower housing is provided with front lower ground engaging wheels, and rear lower ground engaging wheels.

By yet another feature thereof, the mounting system also includes a levelling device comprising a telescoping torsion bar which is pivotally-secured to the housing of the mower, a longitudinally-adjustable link which is secured by a ball-and-socket joint to the frame bed, and connecting linkages which are disposed parallel to the longitudinally-adjustable link but which is perpendicular to the telescopic torsion bar, for adjustably connecting the frame bed to the mower housing.

BRIEF DISCUSSION OF THE DRAWINGS

In the accompanying drawings.

DESCRIPTION OF PREFERRED EMBODIMENTS

Description of FIGS. 1 to 7

Figure 1:
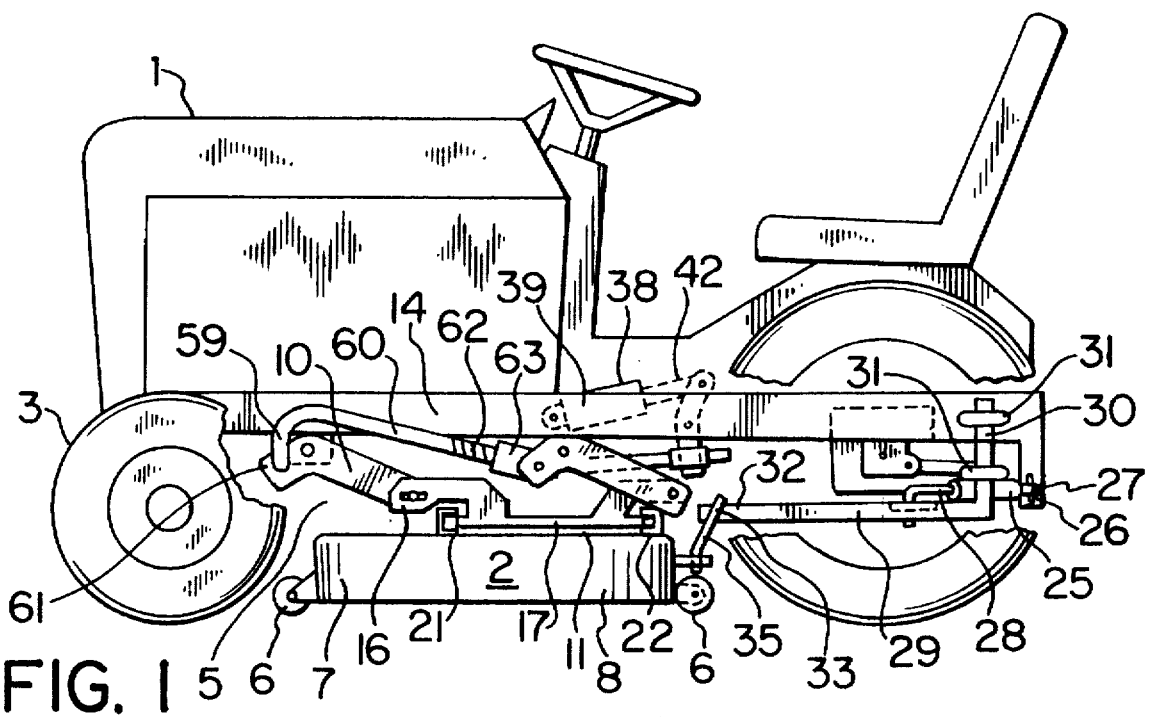
FIG. 1 is a side, elevational view of a grass mower attachment of this invention, secured to a tractor.

Referring to FIGS. 1 to 7, a vehicle with a longitudinal body 1, front steering wheels and axles 3, rear driving wheels 4, and a sufficient bed area between the front and rear axles has a conventional design mower attachment including a housing 2 attached to the bed area, the mower attachment and housing 2 having front lower roller wheels 6, mounted on a lower forward housing area 7 and rear lower wheels 6 mounted on a lower rear housing area 8, to allow the mower housing 2 to ride over turf in order to prevent scalping.

Figure 4:
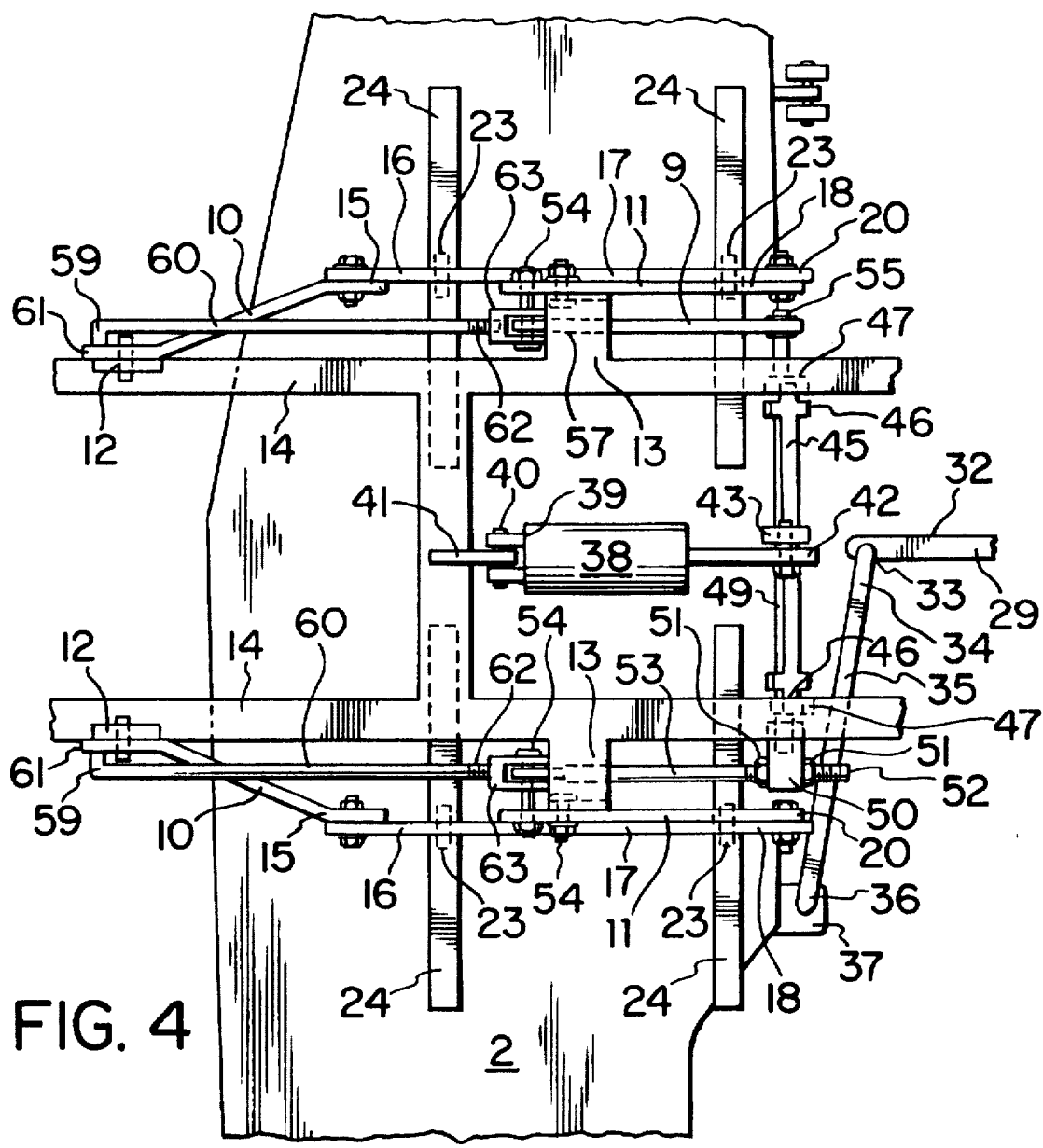
FIG. 4 is an enlarged detail of the lateral shifting mechanism shown in the top plan view of FIG. 2.
Figure 5:
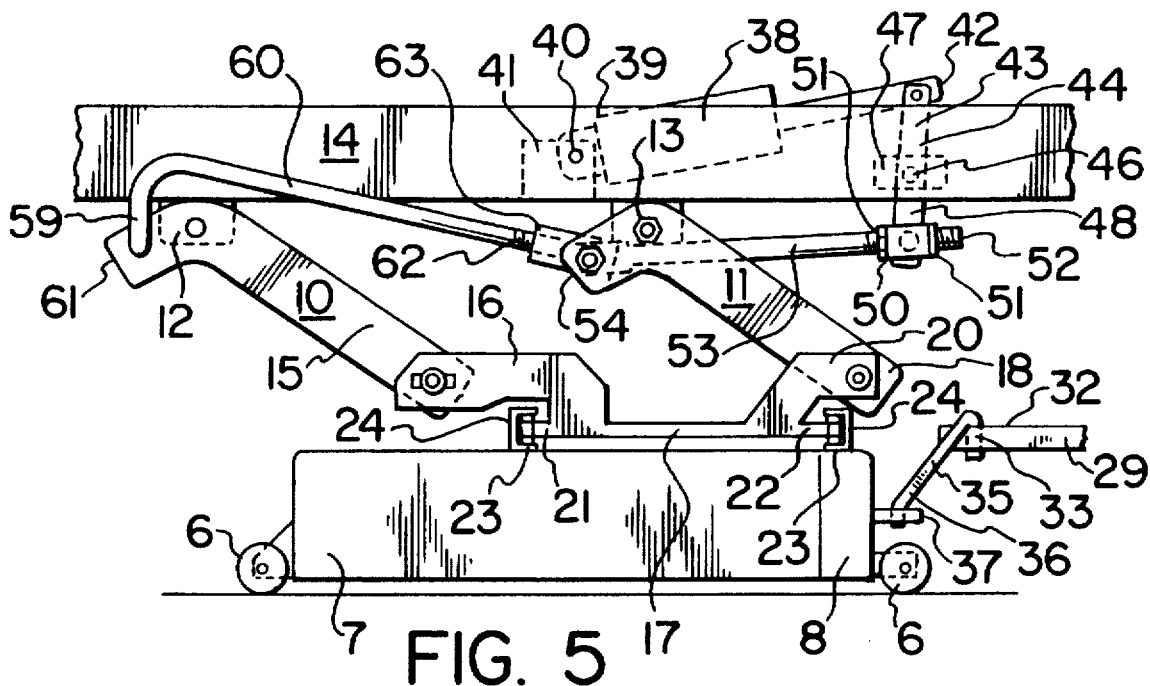
FIG. 5 is an enlarged detail of the horizontal shifting mechanism of the embodiment shown in FIG. 1.

As seen more clearly in FIG. 1 and FIG. 5, and also partially in FIG. 4, the mower housing 2 is suspended from the longitudinal chassis 14 of the vehicle 1 by a suspending mounting system including two forward lifting arms 10, and two rearward lifting arms 11. The two forward lifting arms 10 are pivotally-connected to forward ears 12, and the two rearward lifting arms 11 are pivotally-connected to rearward brackets 13, ears 12 and brackets 13 being securely fastened to the respective longitudinal chassis 14 forming the frame of the vehicle 1. The long legs 15 of the two forward lifting arms 10 are each pivotally-connected at their lower ends to upper forward ends 16 of the tie-rods 17. Similarly, the long legs 18 of the rear lifting arms 11 are each pivotally-connected to upper rear ends 20, of the tie-rods 17. Thus, a parallelogram linkage is provided by longitudinal chassis 14 between ear 12 and bracket 13, by lifting arms 10, by lifting arms 11 and by tie-rods 17.

Both the forward lower end 21 and the rear lower end 22 of each of the tie-rods 17 have sealed-type bearings 23, pressed onto the tie-rods 17. These four bearings 23 serve as rollers which are partially-encased in transversely-mounted track means in the form of four U-channel members 24, which are, in turn, securely fastened to the mower housing 2.

Figure 2:
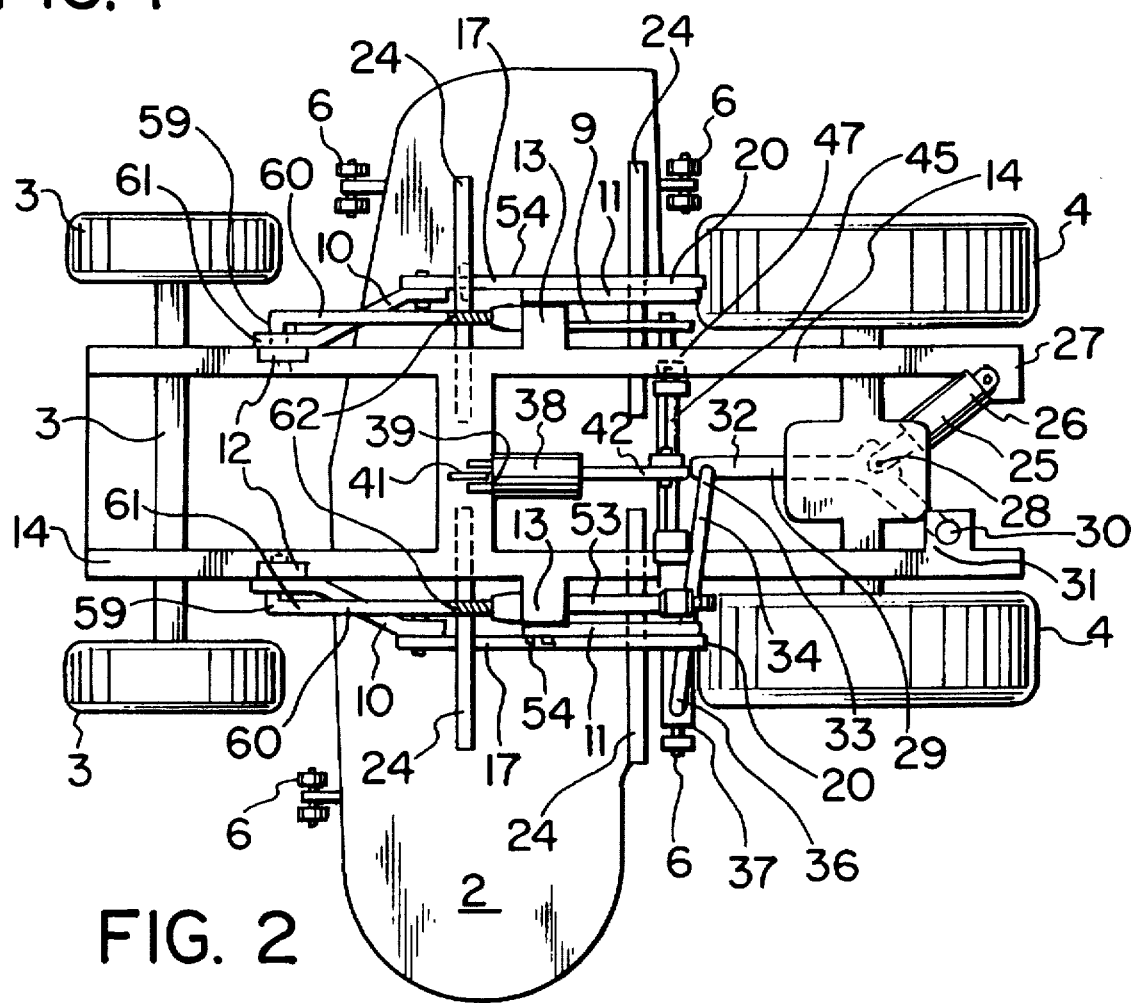
FIG. 2 is a top plan view of the embodiment shown in FIG. 1.

As seen in FIG. 2, a hydraulic cylinder 25 has a rear cylinder end 26 which is pivotally-connected to bracket 27 secured to one longitudinally-extending frame member 14 forming the frame of the vehicle 1. The forward piston rod end 28 of the hydraulic cylinder 25 is pivotally-connected to a small arm (unnumbered) of swing arm 29. The rear leg 30 of the swing arm 29 is supported by two bushings 31, which are themselves securely fastened to the other longitudinally-extending frame member 14 forming the frame of the vehicle 1. Thus, a Y-shaped yoke is defined by arm 29, leg 30, rod end 28 and cylinder 25.

The forward end 32 of the swing arm 29 is pivotally-connected at 33 to the inner end 34 of the link-rod (i.e., lever arm) 35. The outer end 36 of the link-rod 35 is pivotally-connected to a bracket 37 which is, in turn, securely fastened to the mower housing 2.

Figure 3:
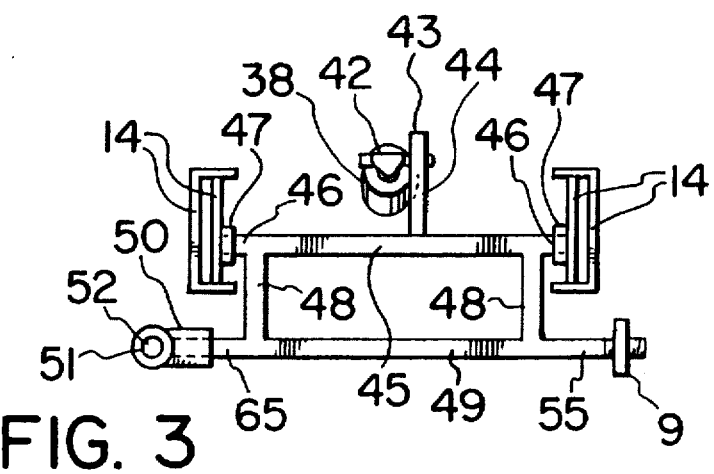
FIG. 3 is a detail of the lateral lifting mechanism of the embodiment of FIG. 1.

As seen in FIGS. 2, 3 and 4, hydraulic cylinder 38, has a forward cylinder end clevis 39 which is pivotally-connected at 40 to a bracket 41 secured to a transverse portion of the frame of the vehicle 1. The piston rod-end 42 is pivotally-connected to the upper end 43 of lever 44. The lower end of the lever 44 is securely fastened to a rotational cross-shaft 45. The outer ends 46 of the rotational cross-shaft 45 are each supported by two bushings 47 which have their outer bodies securely fastened to the frame of the vehicle 1.

As more clearly seen in FIGS. 3 and 5, for each of the suspending mounting systems from the near outer ends of the rotational cross-shaft 45, two levers 48 are securely fastened to the rotational cross-shaft 45, to extend downwardly, and are then securely fastened to a lower cross-shaft 49. The outer end 65 of the lower cross-shaft 49, is pivotally-inserted within the adjusting sleeve 50. The adjusting sleeve 50, with two lock nuts 51, surrounds the rear position 52 of the threaded pull-rod 53. The forward end of the threaded pull-rod 53 is pivotally-connected to the stud 54. Also pivotally connected to stud 54 is a pull rod 60, whose forward end 59 is pivotally-connected to short leg 61 of forward lifting arm 10. The rear threaded portion 62 of the pull-rod 60 is threaded into an adjustable clevis 63, and is pivotally-connected to stud 54. (See FIG. 7)

Figure 6:
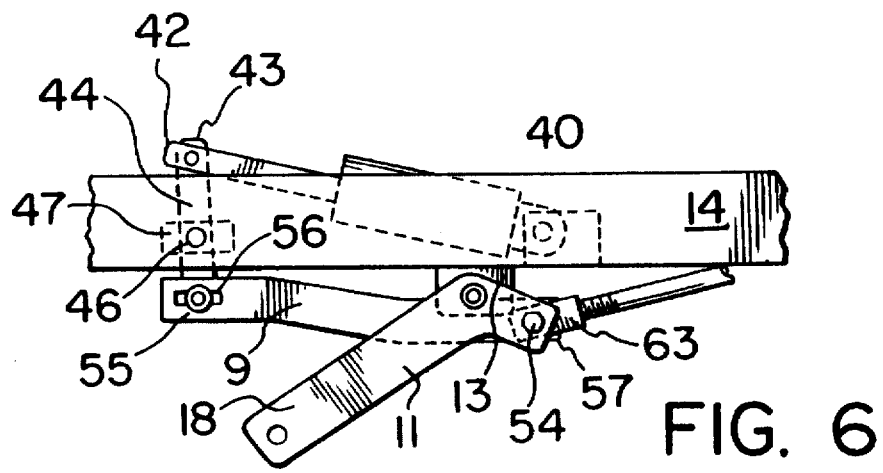
FIG. 6 is an enlarged detail of a variant of the vertical lifting mechanism of the embodiment shown in FIG. 1 and FIG. 5.
Figure 7:
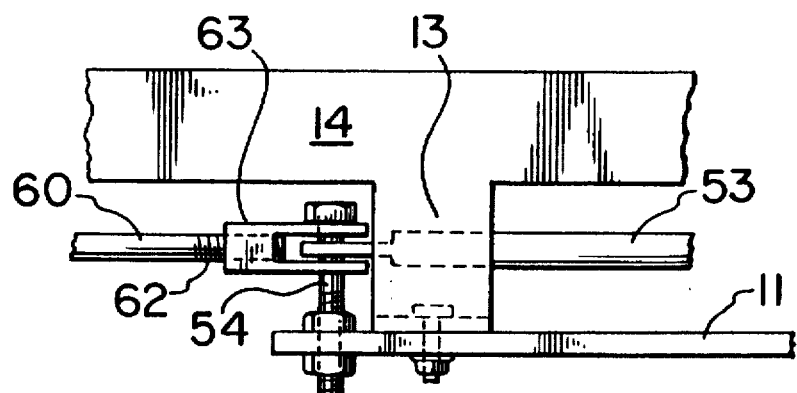
FIG. 7 is a still further detail of a portion of the vertical operating mechanism of the embodiment shown in FIG. 1, FIG. 2, FIG. 4, and FIG. 5.

As seen in FIG. 6, the outer end 55 of the lower cross-shaft 49 is protruded through the slotted opening 56 near the rear position of the pulling link 9. The other end 57 of the pulling-link 9 is pivotally-connected to the stud 54.

Thus the embodiment shown in FIG. 6 is similar to the embodiment shown in FIG. 5 with the exception that there is one pulling link 9 which is in the form of a flat piece of steel with a slot 56 at one end thereof.

Figure 8:
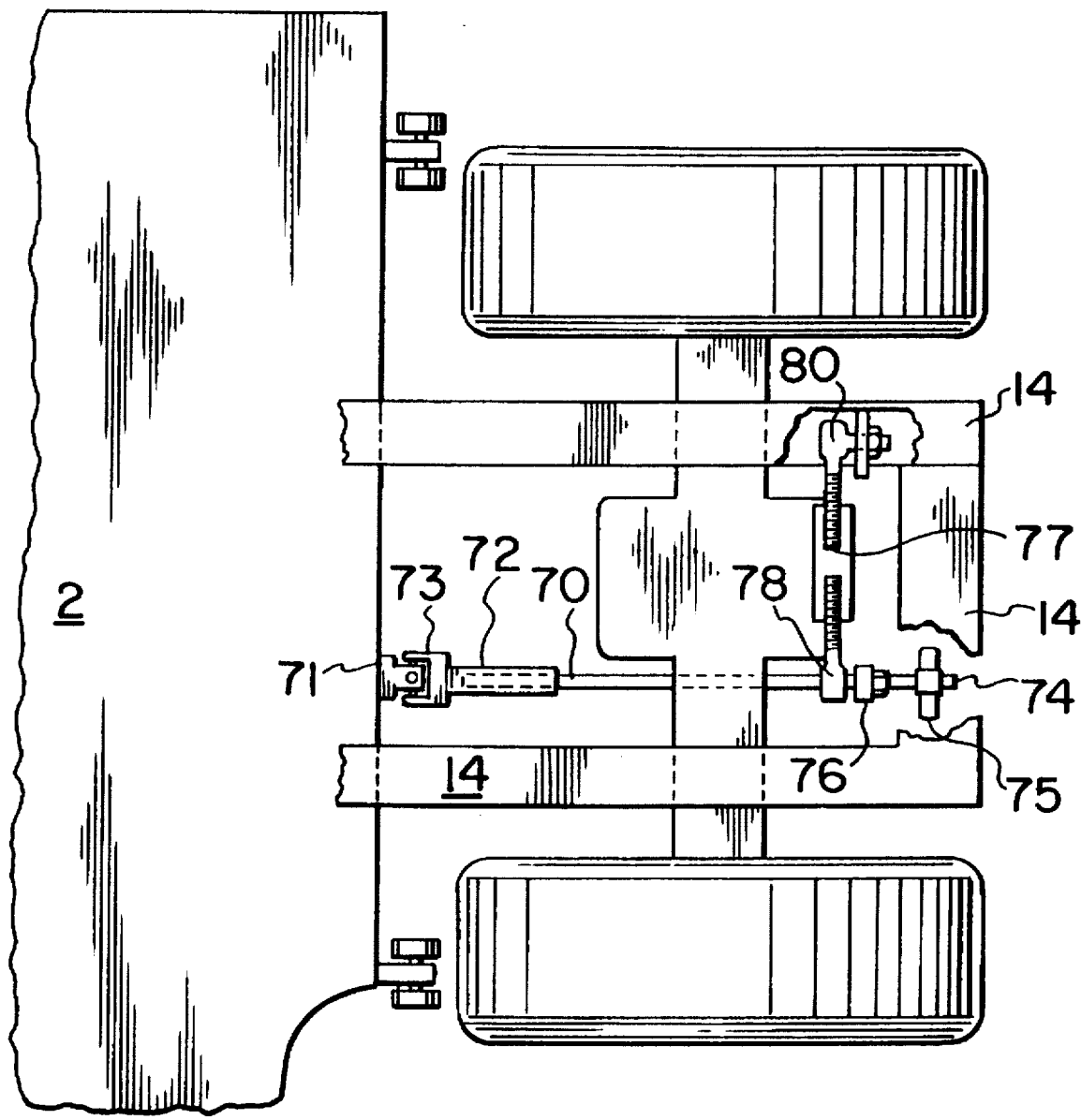
FIG. 8 is an enlarged bottom plan view of a levelling device useful with the embodiment of the invention shown in FIGS. 1 and FIG. 2.
Figure 9:
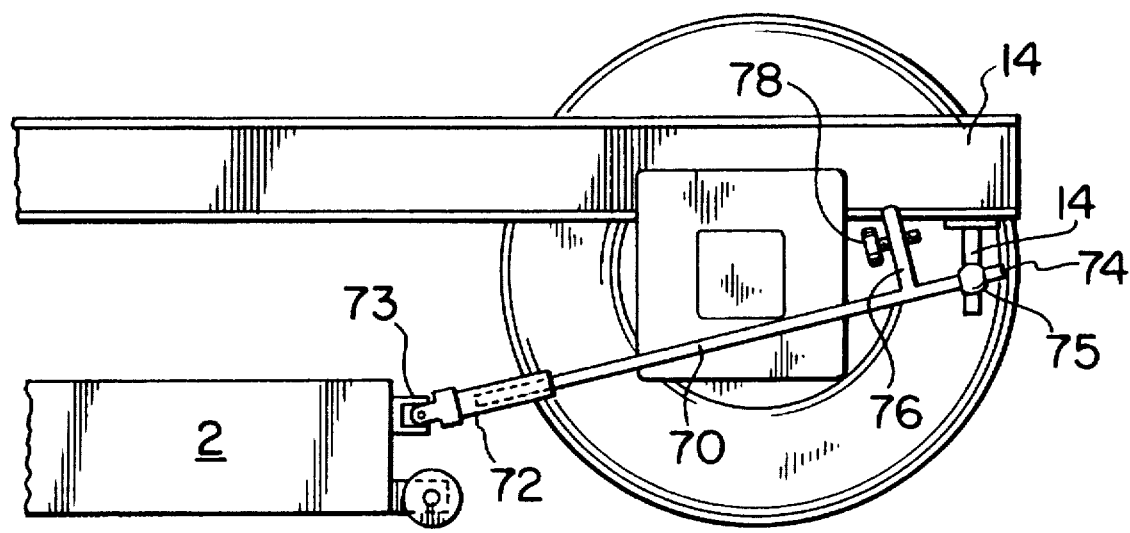
FIG. 9 is an enlarged side, elevational view of the levelling device of FIG. 8 with the left frame rail removed for clarity.
Figure 10:
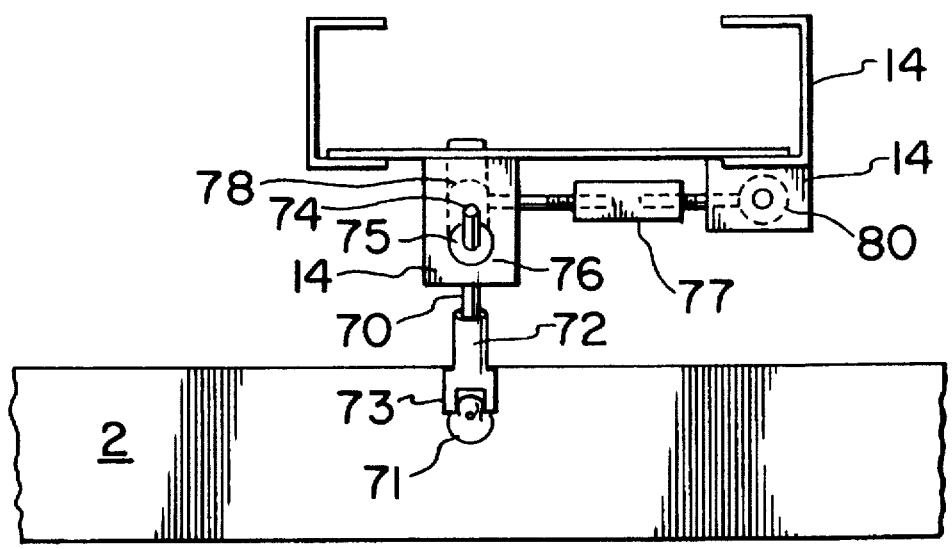
FIG. 10 is an enlarged elevational view of the device of FIG. 8 also showing an end view of a supporting vertical frame.

Description of FIGS. 8 to 10

Referring to FIGS. 8 to 10, a novel horizontal levelling mechanism is shown which would be provided as an option on this grass cutting machine, or on any other horizontal shifting machine, where there tends to be a drooping effect caused by the transfer of weight to the extreme right or left of the supporting vehicle or machine.

This levelling device includes a two-piece telescoping square cross-sectional outer torsion bar 72, extending rearward from the mower housing 2 from a lateral area close to the horizontal balancing point. One end of this outer torsion bar is hinged to the mower housing 2 by a flexible joint 73 that allows a 360 degree of deflection angle and zero degrees of rotation. The rearmost end 74 of this torsion bar 70 is attached to the vehicle frame 14 by means of a flexible joint 75, that allows the torsion bar 360 degrees of defection and free rotation in either direction. A lug 76 extends vertically upwardly from the torsion bar 70, with its lower end welded securely to the inner telescoping torsion bar 70, a short distance from its rearmost end 74. This lug 76 supports one end of a longitudinally-adjustable link 77, by means of a ball stud and socket joint 78. The opposite end of this longitudinally-adjustable link 77 is fastened to the frame of the vehicle 1 by means of a ball stud and socket joint 80.

Operation of the Embodiments of FIGS. 1 to 7

In operation, the hydraulic cylinder 25 is activated to cause the mower attachment 2 to move from side to side in a lateral direction independently of the supporting vehicle 1. Such lateral movement is achieved as follows: when piston rod-end 28 extends, swing arm 29 pivots counterclockwise. This, in turn, pulls link rod 35 downwardly. Such downward motion causes the mower housing 2 to move transversely across the vehicle 1 (i.e., in a direction from the bottom to the top as shown in FIG. 2) by rolling of the wheels 23 in channel member 24. Conversely, when the piston rod-end 28 retracts, swing arm 29 pivots clockwise. This pulls link rod 35 upwardly. Such upward motion causes the mower housing 2 to move transversely across the vehicle 1 (i.e., in a direction from the bottom to the top as shown in FIG. 2) by rolling of the wheels 23 in channel members 24.

The hydraulic cylinder 38 is activated to lift the mower housing 2, such vertical movement being achieved as follows: extension of the rod-end 42 of the hydraulic cylinder 38 causes pull-rod 53 to move towards the left as shown in FIG. 5. This in turn pushes pull rod 60 towards the left in FIG. 5 and causes lifting arm 10 to rotate in a clockwise direction. This results in the lowering of the mower housing 2. Conversely, retraction of the rod-end 42 of the hydraulic cylinder 38 causes the pull rod 53 to move towards the left as shown in FIG. 5. This in turn pushes the pull rod 60 to the left in FIG. 5 and causes lifting arm 10 to rotate in a counterclockwise direction. This results in the raising of the mower housing.

If the embodiment of FIG. 6 is used, a pull link 9 in the form of a flat piece of steel is used instead of the pull rod 60. The movement of the pull link 9 is exactly the same as the movement of the pull rod 60. Accordingly, the operation of the embodiment of FIG. 6 is the same as the operation of the embodiment of FIG. 5.

Operation of Embodiments of FIGS. 8 to 10

In operation, when the mower housing 2 is shifted horizontally to the right or left, it will cause a lateral movement of the torsion bar 70 at an area directly below the ball stud and socket joint 78, where it is hinged to the upper lug body 76. As this ball stud and socket joint 78 cannot move laterally, it will cause the torsion bar 70 to rotate slightly. This slight rotation of the telescoping torsion bar 78 will be transferred forward to the cutting assembly, or the horizontal side to side shifting machine. This rotational force through the torsional bar 70 will overcome the tendency of the cutting assembly, or of the horizontal side to side shifting machine to droop as it is shifted to the right or left of the supporting vehicle or mechanism.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. In combination, a motor driven vehicle having front wheels and rear wheels and a longitudinally-extending frame bed therebetween, and a transversely-mounted powered grass cutting mower, having a housing and powered grass cutting blades, mounted to the frame bed by means of a suspending mounting system, said suspended mounting system comprising:

(i) transversely-mounted track means which are pivotally-secured by a parallelogram linkage to said longitudinally-extending frame bed of said motor driven vehicle, said track means including first powered operating means for moving said transversely-mounted track means and thus for moving said mower housing through an infinite number of vertical locations between an upper limit and a lower limit; and (ii) roller means rollingly operatively associated with said transversely-mounted track means, said track means being mounted on said mower housing and a second powered operating means, for moving said mower housing through linkage means connected to said mower housing through an infinite number of lateral locations between a left lateral limit and a right lateral limit.

2. The combination of claim 1 wherein said track means includes two pairs of longitudinally spaced-apart transversely-extending U-channel members.

3. The combination of claim 2 wherein said second powered operating means includes a hydraulic cylinder forming part of a Y-shaped yoke, one arm of said Y-shaped yoke being pivotally-connected to the rear of a first longitudinally-extending frame member forming a part of said frame bed, a leg of said Y-shaped yoke being pivotally-connected to one end of a lever arm, the other end of said lever arm being pivotally-connected to said mower housing, and an arm of said Y-shaped yolk being pivotally-connected to the piston rod end of a hydraulic cylinder, whose cylinder end is pivotally-connected to the rear of a second longitudinally-extending frame member forming a part of said frame bed.

4. The combination of claim 1 wherein said mower housing is provided with front lower ground engaging wheels and rear lower ground engaging wheels.

5. The combination of claim 1 also including a levelling device comprising: a telescoping tension bar which is pivotally-secured to said housing of said mower; a longitudinally-adjustable link which is secured by a ball and socket joint to said frame bed; and ball and socket joint linkages which are disposed parallel to said longitudinally-adjustable link but which are also perpendicular to said telescopic torsion bar, for adjustably connecting said frame bed to said mower housing.

6. The combination of claim 1, wherein said parallelogram linkage comprises a right linkage and a left linkage, each said linkage including a first arm which is pivotally-connected at its upper end to a first point of a first longitudinally-extending frame member forming a part of said frame bed, a second arm which is pivotally-connected at its upper end to a longitudinally-spaced-apart second point of said one longitudinally-extending frame member, and a third arm which is pivotally-connected at its forward end to the lower end of said first arm and which is pivotally-connected at its rear end to the lower end of said second arm, a fourth element of said parallelogram linkage comprising the longitudinally-spaced-apart portion of said longitudinally-extending frame member between said first point and said second point.

7. The combination of claim 6 wherein said first powered operating means comprises a hydraulic cylinder, a cylinder end of which is pivotally-connected to a transverse member interconnecting two longitudinally-extending frame members forming said frame bed, and a piston rod end of which is pivotally-connected to a lever which is attached to a rotational cross-shaft which is secured to one end of a linkage rod and pull rod, said pull rod being pivotally operatively-connected to said first arm.

8. The combination of claim 6 wherein said first powered operating means comprises a hydraulic cylinder, a cylinder end of which is pivotally-connected to a transverse member interconnecting two frame members forming said frame bed, and a piston rod end of which is operatively-connected to a lever which is operatively attached to a pulling link by a rotational cross-shaft protruding through a longitudinally-extending slot in said pulling link, said pulling link being secured to one end of a linkage rod and a pull rod, said pull rod being pivotally operatively-connected to said first arm.

* * * * *

UNITED STATES PATENT AND TRADEMARK OFFICE
CERTIFICATE OF CORRECTION

PATENT NO. : 5,483,789
DATED : January 16, 1996
INVENTOR(S) : Elwyn W. Gummerson It is certified that error appears in the above-indentified patent and that said Letters Patent is hereby corrected as shown below:

```
Column 2, line 53, delete "over" and insert --mover--
Column 5, line 21, delete "bottom" and insert --top--
Column 5, line 28, after "the" insert --levelling--

Column 7, line 19, delete "pulls" and insert --pushes--
Column 7, line 21, delete "bottom" and insert --top--
Column 7, line 22, delete "top" and insert --bottom--
Column 7, line 37, delete "left" and insert --right--
Column 7, line 38, delete "pushes" and insert --pulls--
Column 7, line 57, delete "78" and insert --70--
```

Signed and Sealed this

Tenth Day of December, 1996

Attest:

BRUCE LEHMAN

*Attesting Officer*     Commissioner of Patents and Trademarks